A. H. HOYT.
ELECTRIC MEASURING INSTRUMENT.
APPLICATION FILED JAN. 20, 1908.

940,319.

Patented Nov. 16, 1909.

Witnesses:
Jas. J. Maloney.

Inventor:
Adrian H. Hoyt,
by J. P. and H. Livermore
Attys.

UNITED STATES PATENT OFFICE.

ADRIAN H. HOYT, OF PENACOOK, NEW HAMPSHIRE.

ELECTRIC MEASURING INSTRUMENT.

940,319.  Specification of Letters Patent.  Patented Nov. 16, 1909.

Application filed January 20, 1908. Serial No. 411,700.

*To all whom it may concern:*

Be it known that I, ADRIAN H. HOYT, a citizen of the United States, residing in Penacook, in the county of Merrimack and State of New Hampshire, have invented an Improvement in Electric Measuring Instruments, of which the following description, in connection with the accompanying drawings, is a specification, like letters on the drawings representing like parts.

The present invention relates to an electric measuring instrument, and is embodied in an instrument of that type in which an armature consisting of coiled wire receives the current, said armature being pivotally supported in the magnetic field of a permanent magnet and provided with a pointer arranged to travel over a dial to indicate in suitable units the effect of the current flowing through the instrument.

It is the purpose of the invention to simplify the construction and to reduce the friction in the pivotal support for the coil or armature, the construction being such, moreover, that the liability of damage is lessened, the original adjustment being permanent and not likely to be varied through any bending or displacement of the outer parts of the instrument.

The instrument embodying the invention is provided with a permanent magnet having pole pieces and an iron core extending through the magnetic field, the coil or armature being in the form of a loop extending around the said core between it and the pole pieces and pivotally supported coaxially with the core. This pivotally supported member is provided with springs which hold it normally in a predetermined position from which it is moved by the influence of current flowing through, there being a suitable pointer and scale to indicate the measurement. In accordance with the invention, the armature is pivotally supported in the core which, in turn, is rigidly supported with relation to the polar extremities of the permanent magnet, the core, armature and armature support thus making a complete unit the parts of which can be properly adjusted before the instrument is assembled. The spring or springs which must be insulated from the rest of the instrument, are connected with external arms through insulating connections, these connections being entirely independent of the pivotal support, so that any changes or distortion of the insulating material cannot affect the adjustment of the armature.

Figure 1:
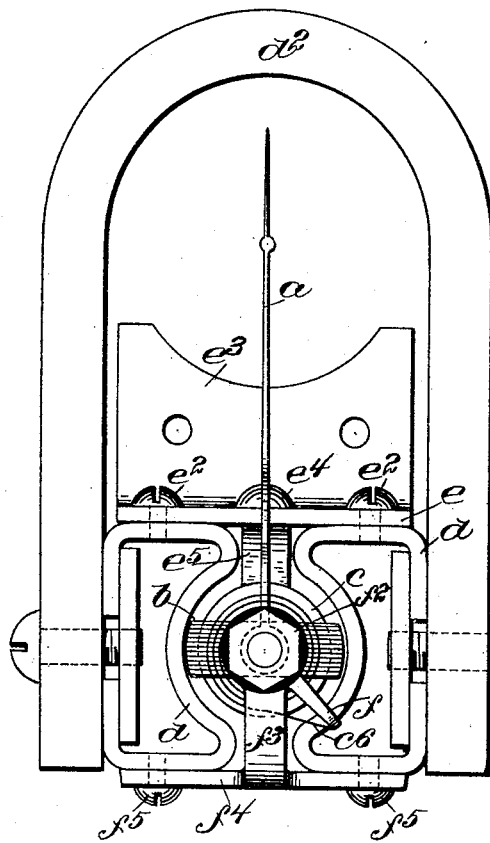
Figure 2:
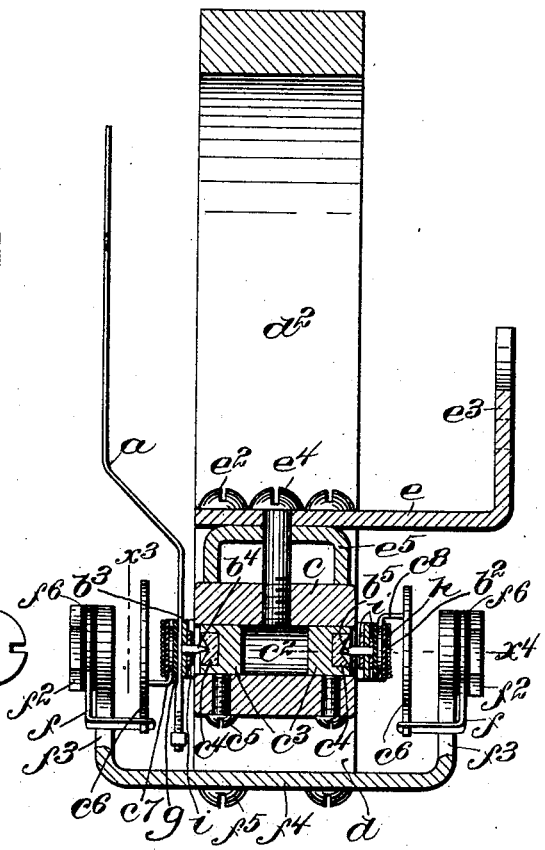
Figure 3:
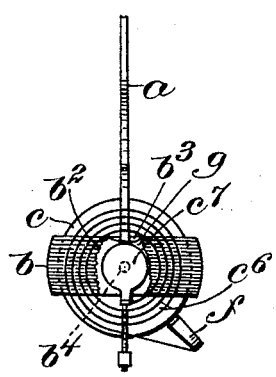
Figure 4:
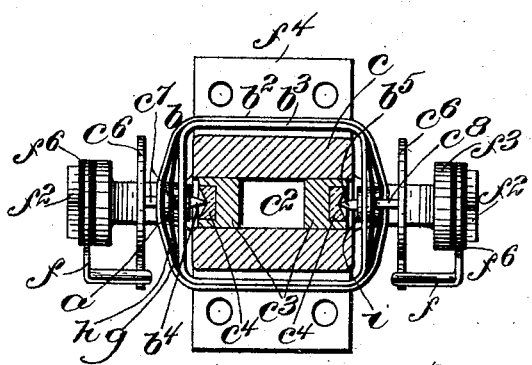

Figure 1 is a front elevation of an instrument embodying the invention with the casing and dial removed; Fig. 2 is a transverse vertical section of the same; Fig. 3 is a detail view on line $x^3$ of Fig. 2; and Fig. 4 is a horizontal section, on the line $x^4$ of Fig. 2.

The casing and dial are not herein shown, since they may be of any suitable or usual type and arranged and calibrated according to the use to which the instrument is to be put.

The measuring pointer $a$ is connected with the pivotally supported movable member $b$ which consists of a coil of wire $b^2$ wound on a frame $b^3$ extending around a fixed core $c$ which is located between the pole pieces $d$ connected with the permanent magnet $d^2$. In accordance with the invention, the pivotal support for the armature $b$ is located in the core $c$, the said core having a longitudinal bore $c^2$ in which are fitted bearing members $c^3$ having jewels $c^4$ to afford bearings for the pivots $b^4$ and $b^5$ connected with the opposite ends of the armature frame $b^3$ and projecting inward therefrom. In the construction shown, the members $c^3$, which may be of brass, are fitted into the bore $c^2$ and held in position after the proper adjustment is made by means of set screws $c^5$. The bearing surfaces for the pivots $b^4$ and $b^5$ are shown as jewels set into the members $c^3$, it being obvious that if the instrument is used in a horizontal position the armature will be hung on the upper bearing, thus giving better results than in cases where the pivot bearings are outside to coöperate with outwardly projecting pivots. The core $c$ with the armature pivotally connected thereto is shown as supported from an upper member $e$ connected by means of screws $e^2$ with the upper surface of the pole pieces $d$, this member being further shown as provided with an upwardly projecting portion $e^3$ which can be utilized as a support for the instrument within a suitable casing, not shown. In order to fasten the core $c$ to the member $e$ the said core is connected therewith by means of a screw $e^4$, the position of the core being determined by means of an intermediate supporting member $e^5$ against which the core is snugly held by means of said screw. The springs $c^6$ which hold the armature and its pointer in a normal or zero position when no current is going through are connected with independent members $c^7$ and $c^8$. These members which are independent of the armature pivots are suitably connected with the outer sides of the armature frame $b^3$, preferably being secured thereto by cement. The outer ends of the springs $c^6$ are connected with stationary members $f$ adjustably connected by means of nuts $f^2$ with uprights $f^3$ projecting upward from a lower frame plate $f^4$ connected by screws $f^5$ with the pole pieces $d$. It is obvious, therefore, that any distortion of the arms $f^3$ or any displacement due to swelling or warping of the insulating material $f^6$ will have no effect upon the adjustment of the instrument since these arms are entirely independent of the pivotal support.

A further improvement consists in the construction of the armature, as shown, in which all the parts connected to the frame $b^3$ are surrounded and held in position by the winding $b^2$. As best shown in Figs. 2 and 4, the pointer $a$ is secured directly to one end of the frame $b^3$, and the spring support $c^7$ is secured outside of the pointer with a strip of insulating material $g$ between. At the other end of the frame the spring support $c^8$ is similarly fastened. Strips of insulating material $h$ are then secured over the outer surfaces of the spring supports, and the coil $b^2$ is wound outside of all. The pivots are reinforced by washers $i$. Thus, the winding itself serves to bind all the parts together, and the structure is very strong, and the parts securely held together, even if the cement or other fastening material fails to adhere firmly.

Claim.

In an electric measuring instrument, the combination with a permanent magnet of the horse-shoe type; of an armature support comprising pole-pieces adapted to be secured to the inner sides of the permanent magnet; upper and lower members joining said pole-pieces; a core connected with one of said members; bearings located in the ends of said core; an armature frame surrounding said core and provided with pivots to engage said bearings; a pointer connected to said armature frame; an arm connected with said frame; a coil-spring connected at one end with said arm and at the other end with one of the members which join the pole-pieces; and an armature winding extending around said armature frame, outside of the parts connected therewith.

In testimony whereof, I have signed my name to this specification in the presence of two subscribing witnesses.

ADRIAN H. HOYT.

Witnesses:
HORACE B. SHERBURNE,
RALPH H. SHERBURNE.